United States Patent [19]
Smith

[11] Patent Number: 5,971,115
[45] Date of Patent: Oct. 26, 1999

[54] TILT CONTROL APPARATUS FOR VEHICLES

[75] Inventor: S. Gregory Smith, Yorklyn, Del.

[73] Assignee: Cloud Farm Associates, L.P., Yorklyn, Del.

[*] Notice: This patent issued on a continued prosecution application filed under 37 CFR 1.53(d), and is subject to the twenty year patent term provisions of 35 U.S.C. 154(a)(2).

[21] Appl. No.: 09/148,090

[22] Filed: Sep. 3, 1998

Related U.S. Application Data

[63] Continuation of application No. 08/794,100, Feb. 3, 1997, abandoned, which is a continuation-in-part of application No. 08/603,164, Feb. 20, 1996, abandoned, which is a continuation-in-part of application No. 08/508,613, Jul. 28, 1995, Pat. No. 5,529,153, which is a continuation-in-part of application No. 08/195,903, Feb. 10, 1994, Pat. No. 5,437,354, which is a continuation of application No. 07/089,238, Jul. 12, 1993, abandoned.

[51] Int. Cl.$^6$ .......................................................... F16F 9/46
[52] U.S. Cl. .................................. 188/266.2; 188/322.13; 188/314; 188/299.1
[58] Field of Search .............................. 188/266.1, 266.2, 188/266.3, 266.4, 266.5, 266.6, 280, 282.1, 282.2, 282.8, 300, 322.13, 322.14, 322.22, 316, 298, 275, 314, 315, 313, 299.1; 267/64.12, 64.15, 183–194, 221–226; 701/38; 280/5.508, 5.502, 5.506, 124.104, 124.106, 5.507, 124.105, 5.51, 6.159, 124.102, 124.161, 124.159, 6.154, 124.112, 104, 5.509, 6.158

[56] References Cited

U.S. PATENT DOCUMENTS

| | | |
|---|---|---|
| 2,124,124 | 7/1938 | Schoepf et al. . |
| 2,787,474 | 4/1957 | Brueder . |
| 2,903,271 | 9/1959 | Vogel . |
| 3,062,330 | 11/1962 | Lyon, Jr. . |
| 3,531,194 | 9/1970 | Roppel et al. . |
| 3,820,812 | 6/1974 | Stubbs . |
| 4,277,076 | 7/1981 | Hanna . |
| 4,579,199 | 4/1986 | Nakayama et al. . |
| 4,765,645 | 8/1988 | Komossa et al. . |
| 4,838,394 | 6/1989 | Lemme et al. . |
| 5,026,248 | 6/1991 | Hamilton . |
| 5,437,354 | 8/1995 | Smith . |
| 5,529,153 | 6/1996 | Smith . |

*Primary Examiner*—Douglas C. Butler
*Attorney, Agent, or Firm*—Herbert M. Wolfson

[57] ABSTRACT

A shock-absorbing, tilt-controlling system is disclosed where the shock-absorbing unit is mounted between the vehicle's frame and axle and a tilt-controlling unit is mounted remotely from, but in communication with the shock-absorbing unit.

8 Claims, 4 Drawing Sheets

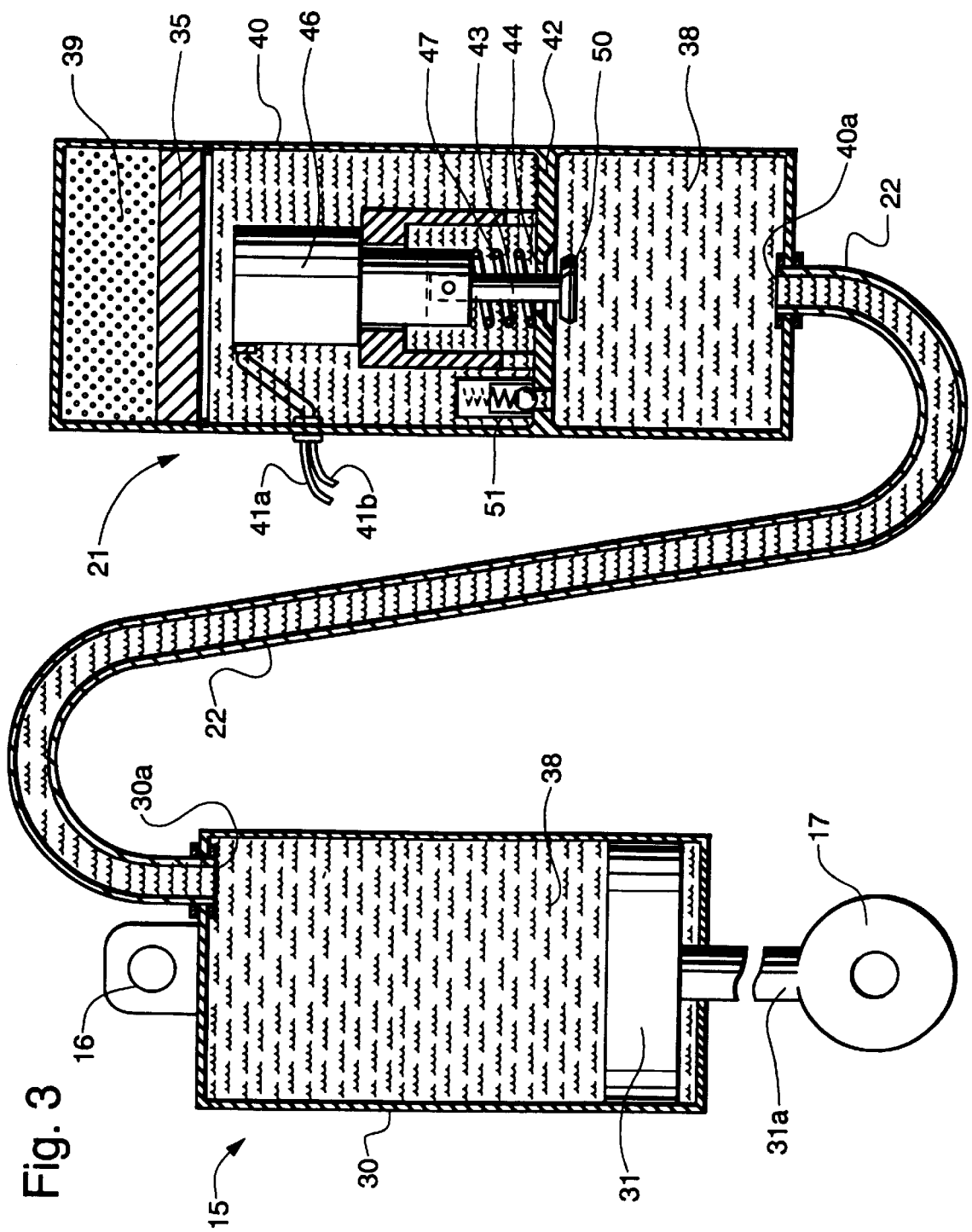

TILT CONTROL APPARATUS FOR VEHICLES

CROSS REFERENCE TO RELATED APPLICATIONS

This application is a continuation of U.S. application Ser. No. 08/794,100 filed Feb. 3, 1997, now abandoned, which was a continuation-in-part of U.S. application Ser. No. 08/603,164 filed Feb. 20, 1996, now abandoned, which was a continuation-in-part of U.S. application Ser. No. 508,613 filed Jul. 28, 1995, now U.S. Pat. No. 5,529,153, which was a continuation-in-part of U.S. Pat. No. application Ser. No. 08/195,903, filed Feb. 10, 1994, now U.S. Pat. No. 5,437, 354 which was a continuation of U.S. application Ser. No. 08/089,238, filed Jul. 12, 1993, now abandoned.

FIELD OF THE INVENTION

The present invention relates to a suspension control system for automotive and railroad vehicles and the like. More particularly, the invention relates to a technology for suppressing vehicular rolling motion, i.e., the tendency of the vehicle to tilt when the vehicle turns a corner or is driven around a sharp curve, without destroying the comfortable ride provided by the conventional spring and shock absorber systems that compensate for the rapid upward and downward movements encountered when the vehicle travels over rough roads.

DESCRIPTION OF THE INVENTION

As shown in the prior art, the conventional spring and shock absorber system is used in automobiles to reduce shock or concussion when the vehicle strikes a bump or, in general, when the movement of the vehicle(s) over a roughness in the surface of the road moves the auto's axle(s) along with the wheel(s) movement. The shock absorber is mounted between the automobile frame and the axles. It normally consists of a piston inside a cylinder partially filled with fluid above the piston. When the wheel hits the bump, instead of the axle communicating the shock directly (normally through a system of springs) to the automobile frame, the piston is pushed upwardly and the fluid in the cylinder resists the movement of the piston as the fluid is pushed upwardly to fill the space above the fluid, thus offsetting the force of the bump. The hydraulic fluid, rather than the frame, absorbs the shock. The ease with which the piston can compress the fluid determines the so-called "hardness" of the ride.

For the "decarbon" shock absorber, the system is composed of a closed housing attached to the vehicle's frame above and a piston unit within the housing which is attached to the axle below. On or incorporated within the piston there may be an assembly of valves and release springs which resist the upward movement of the fluid and, thus, determines the hardness or softness of the ride as the fluid is forced through the valve and spring assembly during the movement of the axle toward the frame. As the fluid is forced through these valves it moves upwardly. Instead of having air or a gas above the fluid which mixes with the fluid during upward movement of the piston, a "decarbon" shock system has a second floating type piston within the cylinder and above the piston attached to the axle. The floating piston serves to prevent the upwardly moving fluid and the gas above it from mixing. To accomplish this, the gas located on the top side of the floating piston is pressurized. When the shock system is compressed by the movement of the body toward the axle, the fluid is forced through the valving and the pressurized gas is further compressed by the fluid pushing the floating piston upward.

When a vehicle turns, the suspension permits the vehicle body to rotate slightly about its longitudinal axis in response to the rolling force exerted on the body during the turn. Typically, vehicle passengers experience this effect as a tilt of the vehicle body, with the side of the body on the outside of the curve being relatively lower and closer to the axle than the side of the body on the inside. Further, the vehicle body tends to pitch forward so that the front of the body is relatively lower than the rear. The pitch and roll combine to incline the vehicle body toward the front corner on the outside of the turn.

The prior art is replete with anti-roll systems that may be added to the conventional shock absorber systems. In general these anti-roll systems are complex requiring several additional pieces of equipment in a space that is already crowded. They counteract vehicle roll by providing lifting forces acting between the vehicle body and suspension on the outside of the curve or by providing a vehicle lowering force acting between the body and suspension on the inside turn side of the vehicle. Some anti-roll systems in the art provide complementary body forces lifting on one side and lowering forces on the opposite side simultaneously with the accompanying array of equipment.

A typical tilt or sway control apparatus is shown in U.S. Pat. No. 2,934,353 issued in 1960 to L. B. d'Avigdor. In this apparatus, the inventor provides at each side of the vehicle, between the axle and the body, a body raising and lowering motor device including an expansible pneumatic chamber and means for supplying air to and discharging it from the chamber to regulate the volume of the chamber. This air supply and exhaust means is controlled by means of electrically operated valves in response to an electrically operated switch mechanism. The switch mechanism responds to centrifugal force and to gravity, and is thus affected by both tilting and lateral acceleration of the vehicle.

It is an object of the present invention to provide an improved tilt control apparatus, improved over the prior art in both effectiveness and in simplicity.

It is a further object to provide such apparatus that will not affect the vehicle body when the vehicle is subjected to roughness in the road, i.e., an apparatus that will not interfere with the vehicle's conventional shock absorber system.

In U.S. Pat. No. 5,437,3534 Smith has provided a relatively simple, but effective sensing unit-tilt controller combination in a moving vehicle that permits the shock absorber system to insulate the body (and the passengers therein) against the sharp upward and downward movement due to road roughness on the straight-away. The tilt or sway of the body is also controlled when the sensing unit "senses" excessive lateral acceleration due to an excessive angular tilt in the road or movement around a curve when the vehicle sways to the outside. This tilt controller is also mounted between the axle and the body and comprises (1) means for sensing the tilt of the axle and the body or frame attached thereto as the axle and the body are tilted, in combination with (2) tilt controlling means mounted between the axle and the body for controlling the tilt of the vehicle so that as the tilt of said axle increases beyond a predetermined amount, the sensing means is activated to send a signal to the tilt controlling means so that further tilt of the body or frame of the vehicle is prevented.

However, one of the shortcomings of combining a tilt control unit with shock absorption is the location and mounting of the unit. In the traditional vehicle, space may sometimes be limited for welding brackets onto the frame and then to place a tilt control unit which does not interfere with the turning tires of the front wheels. Furthermore, auto manufacturers are trying to minimize the amount of steel used for the frame to reduce the weight of the vehicle. This may result in a weak structural area in which to weld the brackets to hold an accessory tilt control unit, particularly since the force generated by the tilt of a vehicle is much greater than the force generated by the vehicle hitting a pothole. This force generated during tilt may even bend the frame if the frame is not structurally sound.

In U.S. Pat. No. 5,529,153, Smith has incorporated the sensing unit-tilt controller system into the conventional shock absorber system in a single housing; and, thus relieve one of the above-mentioned problems i.e. having to mount both systems in this area between frame and axle. This use of a purpose system is shown in FIG. 2 of U.S. Pat. No. 5,529,153, the disclosure of which is incorporated herein by reference. The addition of a fixed lockplate having a central opening that could be shut to prevent upward movement of fluid and, thus, prevent further tilting is shown in this figure. This system also permits relatively easy insertion into existing vehicles without any significant alteration of the vehicle. It should be understood, however, that some alteration would be necessary to maintain the original amount of cushioning with the shock absorber while allowing room within the housing for insertion of the lockplate and solenoid units required for the tilt control. The space between the frame and the axle is finite, and it is often limited by the location of the springs, wheel, or engine. With the fixed distance between the axle and the frame that currently exists, the addition to the shock assembly of the lockplate assembly to control tilt may require elimination of some of the shock valving which may change the softness of the ride of the vehicle unless compensatory alterations to the remaining valves can be made.

The use of a single apparatus having the dual function of shock absorption and tilt control has another shortcoming. If any part of the sensing unit-tilt controller system didn't function correctly or simply stopped functioning because of accident or deterioration, the shock absorption system also stopped functioning. To correct the problem, a completely new tilt controller-shock absorbing system would have to replace the dysfunctioning equipment.

It is an object of this invention to overcome the crowding problems of the separate tilt controller and shock absorption systems as covered in U.S. Pat. No. 5,437,354 without any significant redesign of the vehicle's frame or axles.

It is a further object to overcome the replacement and comfort control problems inherent in a unit that functions as both a shock absorber and a tilt controller as covered in U.S. Pat. No. 5,529,153.

Other objects will appear hereinafter.

SUMMARY OF THE INVENTION

The objects are accomplished by mounting the housing of a single shock-absorbing unit between the vehicle's frame and its axle but incorporating a tilt-controlling unit within a second housing mounted remotely from, but in direct communication, with the upper portion of the first housing that is mounted between the frame and the axle.

The invented apparatus, in its broadest sense, is a shock-absorbing, tilt-controlling system for a vehicle having a transverse axle and a body that comprises, on at least one side of the vehicle, a first chamber at least partially filled with hydraulic fluid and a movable piston at one end of the chamber attached to the transverse axle; the other end of the chamber attached to the body of the vehicle, the other end of the chamber having an opening through which fluid can flow; a second chamber at least partially filled with hydraulic fluid, remotely mounted from the first chamber; an opening in the bottom end of the second chamber; means for communicating between the openings in the first and second chambers and, within which means, hydraulic fluid is moved from the first chamber to the second chamber; a lockplate mounted within and attached to the inner walls of the second chamber, the lockplate having at least one opening separating the fluid within the chamber into two portions; a movable sealing means within the second chamber which, when activated, seals the at least one opening in the lockplate; means for moving the sealing means to seal the opening in the lockplate; means for sensing the tilting movement of the vehicle, combined with the means for moving the sealing means to seal the opening when the sensing means is activated at a set tilt position of the body to prevent flow of the fluid from one portion of the second chamber into the other portion of the chamber and prevent further movement of the piston in the first chamber and thus, prevent further tilting of the body of the vehicle.

Specifically, the preferred embodiment is a shock-absorbing, tilt-controlling system for a vehicle having a transverse axle and a body that comprises, on at least one side of the vehicle, a first chamber fully filled with hydraulic fluid and a movable piston at one end of the chamber attached to the transverse axle; the other end of the first chamber being attached to the body of the vehicle and this other end of the chamber having an opening through which fluid can flow; a second chamber partially filled with hydraulic fluid, remotely mounted from the first chamber; a floating piston within the second chamber separating a compressible gas in the upper, closed end of the second chamber from the hydraulic fluid in the lower portion of the second chamber; an opening in the bottom end of the second chamber; means for communicating between the openings in the first and second chambers and, within which means, hydraulic fluid is moved from the first chamber to the bottom surface of the floating piston in the second chamber; a lockplate mounted within and attached to the inner walls of the second chamber, the lockplate having at least one opening separating the fluid within the chamber into two portions; a movable sealing means within the second chamber which, when activated, seals the at least one opening in the plate; means for moving the sealing means to seal the opening in the plate; means for sensing the tilting movement of the vehicle, combined with the means for moving the sealing means to seal the opening when the sensing means is activated at a set tilt position of the body to prevent flow of the fluid from one portion of the second chamber into the other portion of the chamber and thus prevent further movement of the piston in the first chamber and further tilting of the body of the vehicle. Optionally, the first chamber may comprise an assembly of valves and release springs, i.e., a dampening unit, separate or, preferably, as part of the movable piston in the first chamber, to further control the softness of the ride as the piston is moved upwardly during movement of axle toward frame.

When the vehicle hits a bump the normal decarbon shock system operates with the valving assembly on the piston head determining the amount of cushioning. The fluid is moved upwardly in the housing through the opening in the housing and through the high pressure hose to the remotely located reservoir. In the reservoir chamber, the liquid is forced through the lockplate assembly, which has not been activated, and finally against the floating piston which, in turn, compresses the pressurized gas.

When the vehicle enters a roll or tilt situation, the sensors will be activated to close the lockplate assembly by firing the solenoid to close the opening in the lock plate. The fluid will cease its upward movement; the fluid within the high pressure hose will no longer compress, nor will the fluid within the original shock unit compress any more. The movable piston attached to the axle will also cease to move; and the frame will not move any closer to the axle.

The shock system is mounted in the location built and designed for the original shock absorber. The frame is strong in these areas; the space is well defined and it is out of the way of the wheel, spring, and engine parts. The original shock is simply removed and the "first chamber" unit is bolted to the same position. The flexible high pressure hose is brought out of an opening in this chamber to a location on the frame where the remote reservoir of the "decarbon unit" is attached to the frame. Attachment is accomplished by using screws or bolts or by any other means of attachment, but sufficiently away from the parts of the vehicle that may move and contact it. The wires are then brought from the tilt-sensing system to the appropriate locations in the second chamber or reservoir as will be described in the next sections of this disclosure.

BRIEF DESCRIPTION OF THE DRAWINGS

FIGS. 2 and 3 are vertical-sectional details of apparatus within the definition of the present invention, in which the "decarbon" shock absorber system has been modified to provide two separate but communicating units: (1) the shock absorber unit and (2) a remotely mounted tilt control unit. In FIG. 2, the optional dampening means is shown as a separate unit mounted in the first chamber above the movable piston; and in FIG. 3, the optional dampening means is a valving assembly on the piston head and the hydraulic fluid completely fills the first chamber.

DETAILED DESCRIPTION OF THE DRAWINGS

Figure 1:
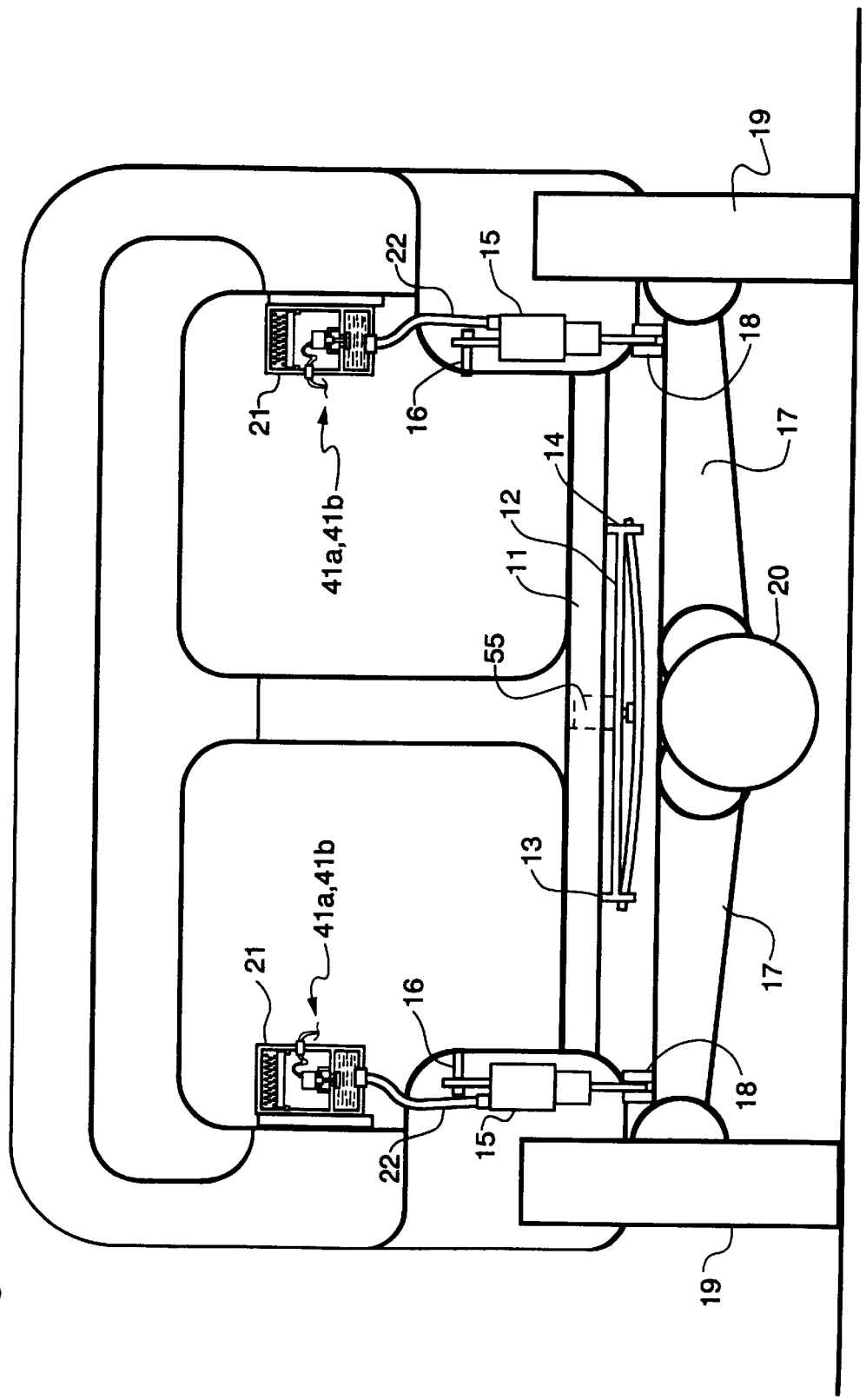
FIG. 1 is a cross-sectional view somewhat diagramatic, showing a vehicle equipped with a shock absorber unit, the remotely mounted tilt control unit and the sensing unit in electrical communication with the tilt control unit.

In FIG. 1, a schematic cross-section of the vehicle through one axle, the sensing unit 12 of the invention is shown attached to the body or frame of the vehicle 11 at positions 13 and 14. The shock absorber unit 15 is connected to the body 11 at position 16 and to the axle 17 at position 18. Connection may be accomplished by welding or by mechanical connectors, e.g., screws, bolts, etc. The wheels 19 are shown mounted on either end of axle 17 and connected to the vehicle's body 11 through conventional suspension means, not shown. The differential for axle 17 is shown at 20.

The tilt-control unit 21, one for each side of the vehicle, is mounted on the frame at a convenient location, not shown, away from any moving parts. A flexible high pressure hose 22 is connected at the opening in the top surface of the chamber of the shock unit 15 and extends to the opening in the bottom surface of the chamber of the tilt-control unit 21.

Figure 2:
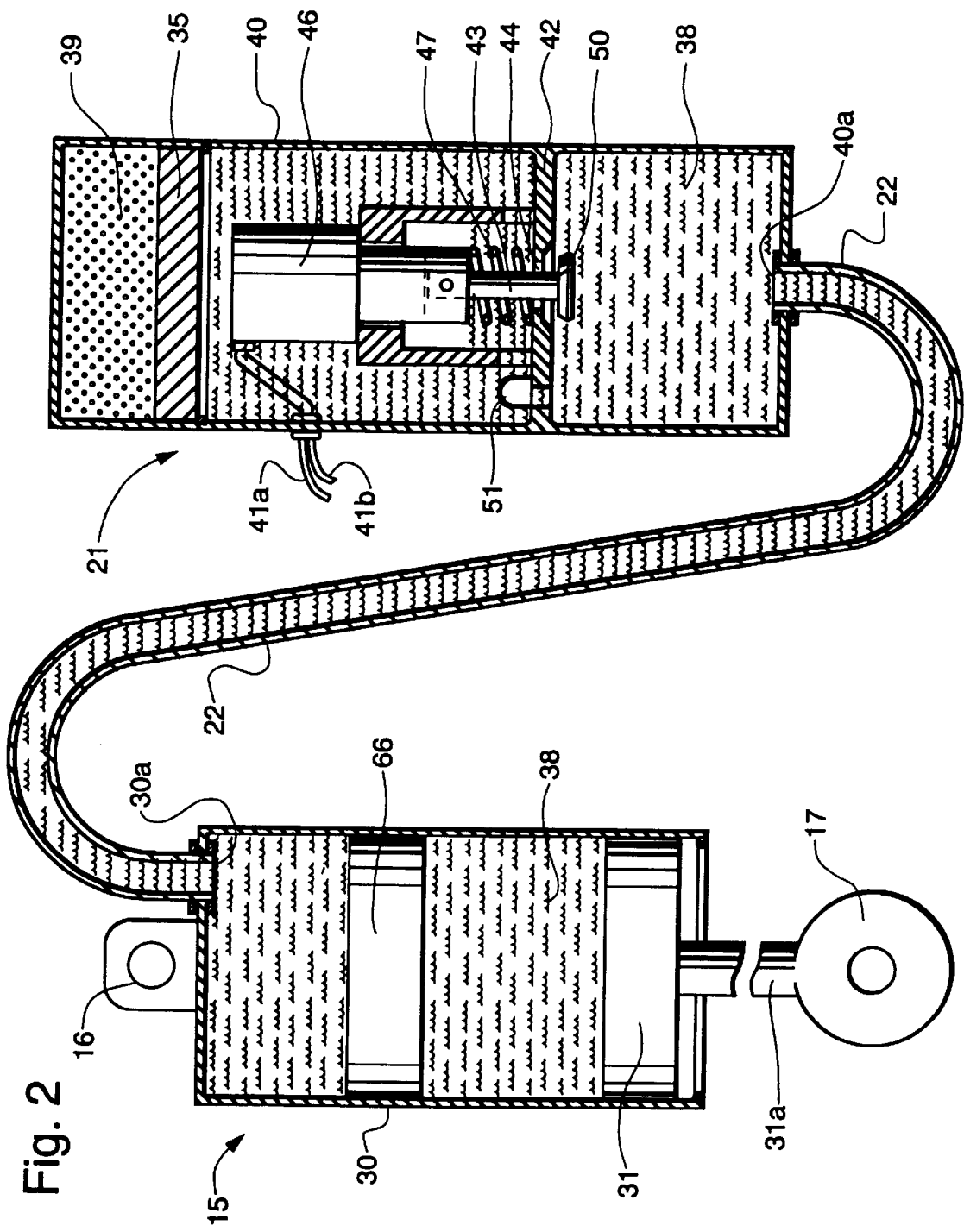

The details of the apparatus of the present invention are shown in FIGS. 2 and 3. The first unit, the shock absorber, 15 is housed in casing 30. It is composed of a piston 31 within the casing, attached to the axle 17 below by rod 31a. Hydraulic fluid 38 is located within the chamber 30 above the piston 31 in FIG. 2 and above and below the piston 31 in FIG. 3, and extends through the opening 30a into the hose 22 and through the opening 40a into the chamber 40 of the tilt-control unit 21.

Figure 4A:
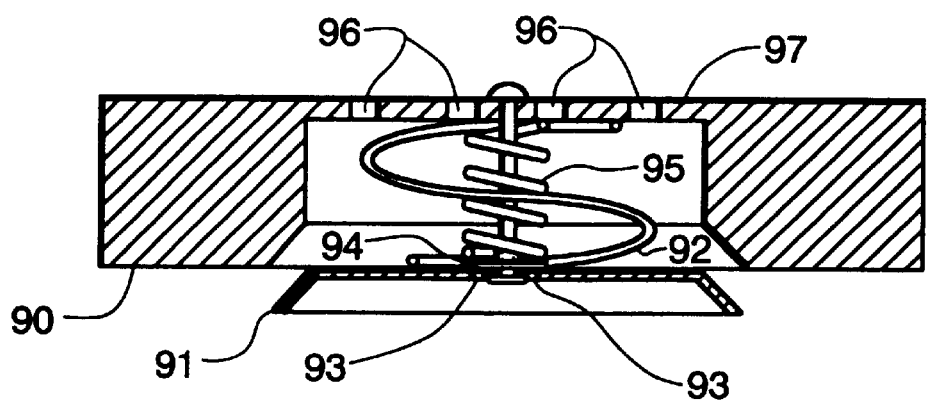
FIGS. 4A and 4B are vertical-sectional details of the optional shock dampening means.
Figure 4B:
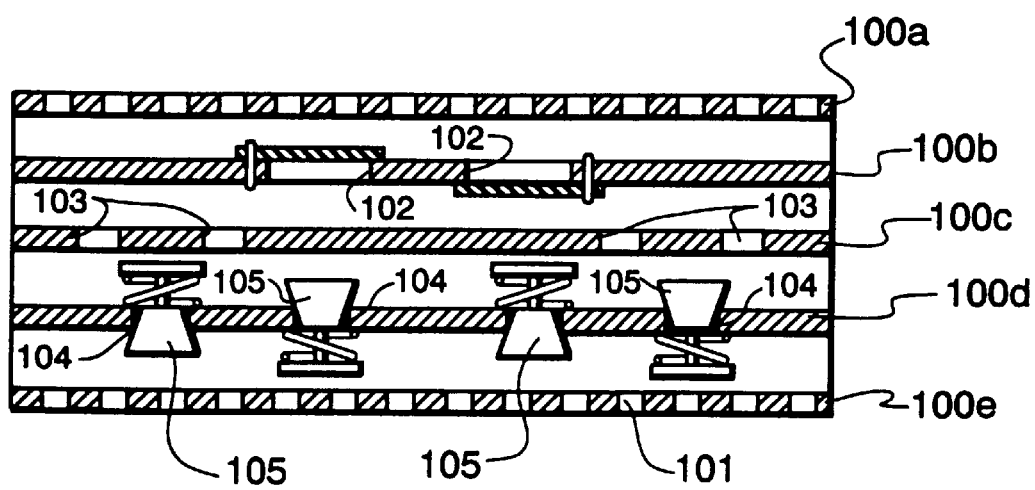

Shock dampening means as shown in detail in FIGS. 4A and 4B may be placed as unit 66 within the casing 30 and above the piston 31 in FIG. 2 or as part of the piston head 31 in FIG. 3. The dampening means may comprise a series of springs and openings as shown in FIG. 4A or a series of plates having openings and pop-off valves as shown in FIG. 4B or may comprise a computeroperated motor acting on the piston 31 to decelerate its bump-induced movement.

The dampening means shown in FIG. 4A is composed of a series of plates, valves and springs in a housing 90 affixed to the inner concentric casing 30 in FIG. 2 or as part of the piston head in FIG. 3 that operate to restrain the flow of fluid through opening 44. Thus, when the shock is compressed, i.e., the distance between axle 11 and frame 17 is reduced, the piston 31 moves upwardly in FIG. 2 and the rod 31a enters the chamber 30 to displace a volume of fluid equal to the volume of the entering rod and, then, to force fluid through the dampening means. The fluid closes valves 91 by compressing a relatively weak spring 92. Each valve has an opening or hole 93 surrounding its center which is blocked by plate 94. Plate 94 is held in place by a small diameter, but very strong spring 95. As pressure builds up based on the continued upward force of fluid, spring 95 becomes compressed, the fluid flows through openings 93 and then through valved openings 96 in plate 97 and into the upper portion of chamber 30 and then through opening 30a to second chamber 40.

The dampening means shown in FIG. 4B is composed of a series of five (5) plates 100a–e affixed to the inner wall of chamber 30 or as the piston head in FIG. 3. The top and bottom plates 100a and 100e have a series of openings 101 arranged in substantially concentric circles. Plate 100b is shown with a centrally located "valved" opening(s) 102, which is pushed open by the upward force of the fluid. The "valve" or flexible plate is placed above the opening(s) 102. Plate 100c is shown with a series of openings or holes 103, that are offset from the openings 101 and 102 arranged to provide additional resistance to fluid flow. Plate 100d is provided with a series of openings 104, each of which are provided with spring operated pop-off valves 105; some openings with valves adapted to resist downward flow and some adapted to resist upward flow.

When the vehicle hits a bump in the road, the fluid is forced past the lockplate 42 through opening 44. A seal 50, attached to a separate piston 43, does not close opening 44 since solenoid 46 is not activated when only a bump is encountered and there is no tilting of the vehicle. The hydraulic fluid 38 passes through the opening 44 filling the chamber 40 but only up to the floating piston 35 which is being forced downwardly by the pressure exerted by the pressurized gas 39 (by means not shown) in the area of chamber 40 above the piston 35. When the shock extends, i.e., the axle 11 moves away from frame 17 of the vehicle, piston 31 moves downwardly; fluid is pulled from the second chamber 40 to pass through openings 96 in plate 97 and through the open upper valve 91.

It should be understood that the above described shock dampening means in FIGS. 4A and 4B are optional in the described system in FIG. 2 but are preferred when using the system shown in FIG. 3 where fluid must flow through the piston head.

Within the chamber 40, the solenoid device 46 is attached to the lockplate 42. The solenoid has a spring assembly 47 anchored to the back of the lockplate 42 and the solenoid's electrical wiring 41a and 41b communicates with a mercury switch of the sensing unit 12. Since the seal 50 is opened and the opening is quite large there is no resistance to compression or fluid flow when encountering a bump.

However, when tilting or unusual lateral acceleration is encountered, the sensing unit will activate the solenoid 46 and cause the seal 50 to close the opening 44 in the lockplate 42. No fluid can then flow from below the lockplate 42 into the area in chamber 40 above the lockplate 42. This prevents any further movement of the piston 31 in the shock unit 15 and any further downward movement or tilting of the body of the vehicle toward the axle 17.

As stated previously, the body of the vehicle 11 is moved up and down by the jarring action of the axle 17. The action, after being transmitted through the two units acting as a shock absorber system, is not sharp enough to upset the passengers within the vehicle nor sufficiently angular to activate the sensing unit of the tilt controller.

However, as axle 17 is tilted more and more by the tilt in the road or by the lateral acceleration of the vehicle around a curve in the road, the axle 17 forces the piston 31 deeper and deeper into the chamber 30 with more and more fluid 38 flowing through opening 44 in the tilt control unit to raise the floating piston 35 against the pressurized gas 39. The tilt of the body 11 approaches closer and closer to the axle 17; and ultimately may shift the center of gravity of the vehicle, particularly for heavy trucks or vehicles carrying heavy loads, into an unstable position if not for the tilt controlling operation of the tilt-control unit 21.

The tilt controller, shown at 21, is electrically combined with the sensing device 12 shown in FIG. 1, and in greater detail in U.S. Pat. Nos. 5,437,354 and 5,529,153, act to prevent the shift of the center of gravity from becoming uncomfortable or, possibly, fatal. Basically, the solenoid 46, activated by the electrical circuit, wires of which are shown at 41a and 41b, which in turn was activated by means shown in my previous patents, e.g., a mercury switch or the like, serves to seal the opening 44 at a predetermined point in the tilting of the vehicle. This closure prevents any further flow of fluid 38 into the area below the compressed piston 35; and also prevents any further tilt of the body toward the axle. Basically, the piston 31, which is now unable to move upwardly, restrains any further tilt of the body of the vehicle instantaneously.

The solenoid device 46 is composed of a rod or piston 43 that fits within the solenoid 46. It is usually spring loaded and attached to the lockplate 42 as shown in FIG. 2. The solenoid 46 is connected to the vehicle's electrical circuit through wires or other electrical connectors 41a and 41b, one to the vehicle's battery and the other to the sensing device 12, shown in greater detail in my earlier patents.

To improve the operation and the flexibility of the described system, other optional features may be used. First, the attachments of the chambers or reservoirs with the flexible high pressure hose connections may be screw type or by other similar means so that they were detachable. This would permit replacement of a part in any section of either unit without always having to remove the whole unit from the vehicle. For example, if the solenoid unit in the tilt-control unit needed servicing, then the gas pressure could be released, the high pressure hose connection unscrewed, the opening in the shock unit capped and the remote reservoir could be removed and attended to without unbolting the main unit from the vehicle.

A second possible option would be to include a high pressure relief valve 51 within the lockplate assembly in the second chamber as shown in FIGS. 2 and 3. The force at which the shaft of the shock absorber will bend can be calculated. In a situation where the vehicle is in a high speed turn with significant tilt and the vehicle encounters a large pothole the force generated could overcome the strength of the shaft and bend or break it. By placing a release valve within the lockplate this mutilation of the shaft could be prevented. When the extreme force is encountered, the release valve would not prevent closure of the opening in the lockplate but by releasing pressure of the fluid below the lockplate would allow fluid to continue to flow through the lockplate assembly even though the solenoid was activated to close the lockplate opening. This would prevent the high force which could bend the shaft of the vehicle from being achieved.

Another optional modification would be the placing of one or more of these relief valves at various pressures so that the suddenness of the movement of the axle toward the frame could be moderated if it were felt necessary in a particular application. By this same mechanism the duration of the stoppage of movement of the frame toward the axle could also be modified. For example, a manufacturer or purchaser of a vehicle having a very soft ride may not want the full effect of the tilt control system. By adjusting the relief valves in the lockplate as described above the parameters controlling tilt and/or shock could be adjusted.

A still further option that could be incorporated would involve completely bypassing the lockplate assembly should there be a highly unlikely malfunction of the spring which keeps the valve open during non-tilt times. Should this be a spring malfunction, the shocks may be inactivated as the lockplate assembly might close and prevent the body from moving toward the axle under any condition. This condition would be immediately sensed by the driver of the vehicle and could also be sensed by a computer. The addition of a device, e.g., a motor driven screw, could be mounted external to the remote reservoir, through the housing of the remote reservoir and into the lockplate. By merely turning the screw, the driver could open a wider passage in the lockplate; the fluid could then bypass the lockplate assembly and thus, could partially or fully eliminate the tilt control function. This would permit the normal shock system to continue its operation. This motor-driven screw device or a similar mechanism known to those skilled in the art, could be activated by remote control by the driver on sensing the failure of a tilt control unit with a very hard ride, and the vehicle would then have a very smooth ride once again although control of tilt would be lost. This would offer a great safety and comfort feature to the driver and occupants.

This option could also be used to adjust the effect of the suddenness of onset of tilt control as discussed above. By leaving a small opening in the lockplate, the onset of tilt control would be slower and not as complete. Varying the opening size would vary these characteristics. A computer could retain preference settings set by the manufacturer or by the individual driver. When a driver entered the vehicle he or she could enter their preferences and the opening could be enlarged, diminished, or eliminated by choosing a preference from the vehicle's computer. Also if the road condition were to change from a normal paved road to a gravel road with a crown type design, the system could be modified remotely by the driver.

Another means of achieving this bypass system would be to have a second high pressure hose leave the main shock absorber housing and enter the remote reservoir above the lockplate assembly. A motorized valve could be placed at this entry point into the reservoir. If the tilt control unit should fail in the closed position by activating the motorized valve the fluid would bypass the lockplate assembly and normal shock function would be restored.

What is claimed:

1. A shock-absorbing, tilt-controlling system for a vehicle having a transverse axle and a body that comprises, on at least one side of the vehicle, a first chamber having two ends, said chamber at least partially filled with hydraulic fluid; a movable piston at one end of the chamber attached to said transverse axle; the other end of said first chamber being attached to said body of said vehicle, said other end of said chamber having an opening through which fluid can flow; a second chamber at least partially filled with hydraulic fluid, having bottom and top ends, remotely mounted from said first chamber; an opening in the bottom end of said second chamber; means for communicating between the openings in said first and second chambers and, within which means, hydraulic fluid is moved from said first chamber to said second chamber; a lockplate mounted within and attached to the walls of said second chamber, said lockplate having at least one opening separating the fluid within said second chamber into two portions; a movable sealing means within said second chamber which, when activated, seals the at least one opening in said lockplate; means for moving the sealing means to seal the opening in said lockplate; means for sensing the tilting movement of said vehicle, combined with the means for moving said sealing means to seal the opening when said sensing means is activated at a set tilt position of said body to prevent flow of said fluid from one portion of said chamber into the other portion of said chamber and thus prevent further movement of said piston in said first chamber and further tilting of said body of said vehicle.

2. A shock-absorbing, tilt-controlling system as in claim 1, wherein dampening means are placed in the first chamber.

3. A shock-absorbing, tilt-controlling system as in claim 2, wherein said dampening means are placed in the first chamber either above the piston or abetted to the upper surface of said piston.

4. A shock-absorbing, tilt controlling system as in claim 1, wherein a pressure relief valve is placed within the lockplate to permit fluid to flow through the lockplate at a pre-set pressure without de-activating the sensing means that has been activated to prevent fluid flow through said at least one opening at a said pre-set tilt position of said body, to moderate the movement of said piston and the tilting of said body.

5. A shock-absorbing, tilt-controlling system for a vehicle having a transverse axle and a body that comprises, on at least one side of the vehicle, a first chamber having two ends, said chamber at least partially filled with hydraulic fluid; a movable piston at one end of the chamber attached to said transverse axle; the other end of said first chamber being attached to said body of said vehicle, said other end of said chamber having an opening through which fluid can flow; a second chamber at least partially filled with hydraulic fluid having bottom and top ends, remotely mounted from said first chamber; a floating piston within said second chamber separating a compressible gas in the upper, closed end of said second chamber from said hydraulic fluid in said second chamber; an opening in the bottom end of said second chamber; means for communicating between the openings in said first and second chambers and, within which means, hydraulic fluid is moved from the said first chamber to the bottom surface of the floating piston in said second chamber; a lockplate mounted within and attached to the inner walls of said second chamber, said lockplate having at least one opening separating the fluid within said chamber into two portions; a movable sealing means within said second chamber which, when activated, seals the at least one opening in said plate; means for moving the sealing means to seal the opening in said plate; means for sensing the tilting movement of said vehicle, combined with the means for moving said sealing means to seal the opening when said sensing means is activated at a set tilt position of said body to prevent flow of said fluid from one portion of said chamber into the other portion of said chamber and thus prevent further movement of said piston in said first chamber and further tilting of said body of said vehicle.

6. A shock-absorbing, tilt-controlling system as in claim 5 wherein dampening means are placed in the first chamber.

7. A shock-absorbing, tilt-controlling system as in claim 6 wherein said dampening means are placed in the first chamber either above the piston or attached to the upper surface of said piston.

8. A shock-absorbing, tilt controlling system as in claim 5 wherein a pressure relief valve is placed within the lockplate to permit fluid to flow through the lockplate at a pre-set pressure without de-activating the sensing means that has been activated to prevent fluid flow through said at least one opening at said pre-set tilt position of said body to moderate the movement of said piston and the tilting of said body.

\* \* \* \* \*

(12) EX PARTE REEXAMINATION CERTIFICATE (10039th)
United States Patent
Smith

(10) Number: US 5,971,115 C1
(45) Certificate Issued: Feb. 12, 2014

(54) TILT CONTROL APPARATUS FOR VEHICLES

(75) Inventor: S. Gregory Smith, Yorklyn, DE (US)

(73) Assignee: Cloud Farm Associates L.P., Yorklyn, DE (US)

Reexamination Request:
No. 90/012,727, Nov. 29, 2012

Reexamination Certificate for:
Patent No.: 5,971,115
Issued: Oct. 26, 1999
Appl. No.: 09/148,090
Filed: Sep. 3, 1998

Related U.S. Application Data

(63) Continuation of application No. 08/794,100, filed on Feb. 3, 1997, now abandoned, which is a continuation-in-part of application No. 08/603,164, filed on Feb. 20, 1996, now abandoned, which is a continuation-in-part of application No. 08/508,613, filed on Jul. 28, 1995, now Pat. No. 5,529,153, which is a continuation-in-part of application No. 08/195,903, filed on Feb. 10, 1994, now Pat. No. 5,437,354, and a continuation of application No. 08/089,238, filed on Jul. 12, 1993, now abandoned.

(51) Int. Cl.
*F16F 9/46* (2006.01)

(52) U.S. Cl.
USPC .............. 188/266.2; 188/299.1; 188/314; 188/322.13

(58) Field of Classification Search
USPC ............ 188/314, 322.13, 322.14, 299.1, 315; 280/124.104, 124.106, 124.112, 777; 180/274; 267/221, 226
See application file for complete search history.

(56) References Cited

To view the complete listing of prior art documents cited during the proceeding for Reexamination Control Number 90/012,727, please refer to the USPTO's public Patent Application Information Retrieval (PAIR) system under the Display References tab.

*Primary Examiner* — Matthew C. Graham

(57) ABSTRACT

A shock-absorbing, tilt-controlling system is disclosed where the shock-absorbing unit is mounted between the vehicle's frame and axle and a tilt-controlling unit is mounted remotely from, but in communication with the shock-absorbing unit.

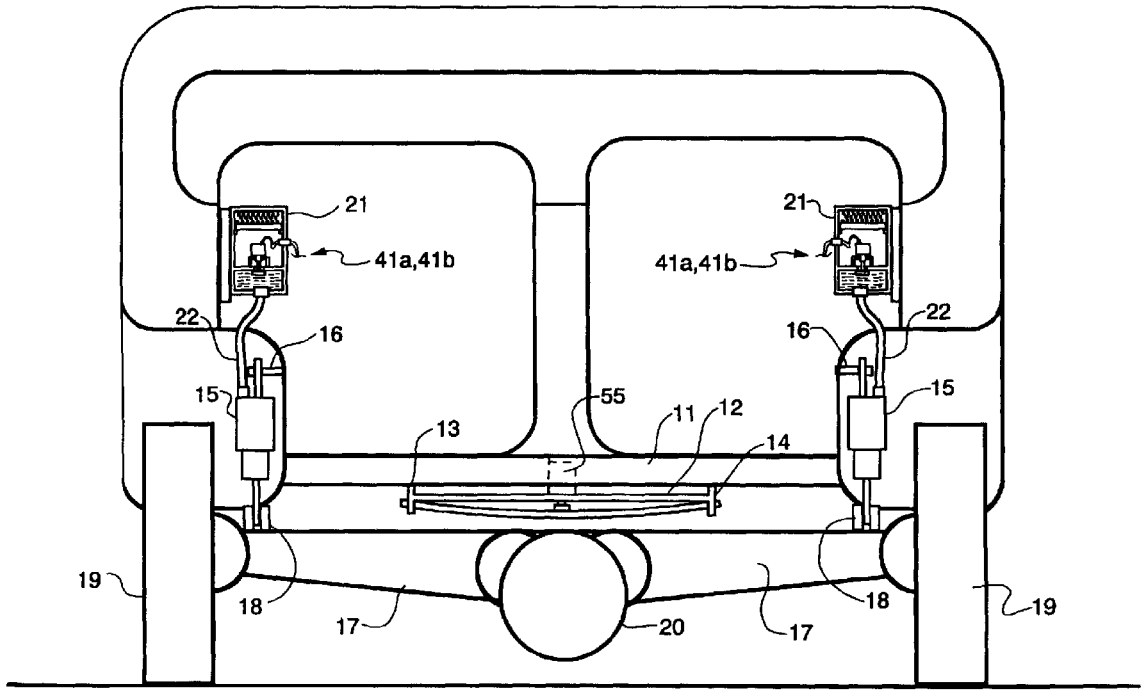

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 4 is confirmed.

Claims 2-3 and 5-8 were not reexamined.

* * * * *

(12) EX PARTE REEXAMINATION CERTIFICATE (10426th)
United States Patent
Smith

(10) Number: US 5,971,115 C2
(45) Certificate Issued: Dec. 5, 2014

(54) TILT CONTROL APPARATUS FOR VEHICLES

(75) Inventor: S. Gregory Smith, Yorklyn, DE (US)

(73) Assignee: Cloud Farm Associates L.P., Yorklyn, DE (US)

Reexamination Request:
No. 90/013,158, Feb. 26, 2014

Reexamination Certificate for:
Patent No.: 5,971,115
Issued: Oct. 26, 1999
Appl. No.: 09/148,090
Filed: Sep. 3, 1998

Reexamination Certificate C1 5,971,115 issued Feb. 12, 2014

Related U.S. Application Data

(63) Continuation of application No. 08/794,100, filed on Feb. 3, 1997, now abandoned, which is a continuation-in-part of application No. 08/603,164, filed on Feb. 20, 1996, now abandoned, which is a continuation-in-part of application No. 08/508,613, filed on Jul. 28, 1995, now Pat. No. 5,529,153, which is a continuation-in-part of application No. 08/195,903, filed on Feb. 10, 1994, now Pat. No. 5,437,354, and a continuation of application No. 08/089,238, filed on Jul. 12, 1993, now abandoned.

(51) Int. Cl.
*F16F 9/46* (2006.01)

(52) U.S. Cl.
USPC ............... 188/266.2; 188/299.1; 188/314; 188/322.13

(58) Field of Classification Search
None
See application file for complete search history.

(56) References Cited

To view the complete listing of prior art documents cited during the proceeding for Reexamination Control Number 90/013,158, please refer to the USPTO's public Patent Application Information Retrieval (PAIR) system under the Display References tab.

*Primary Examiner* — William Doerrler

(57) ABSTRACT

A shock-absorbing, tilt-controlling system is disclosed where the shock-absorbing unit is mounted between the vehicle's frame and axle and a tilt-controlling unit is mounted remotely from, but in communication with the shock-absorbing unit.

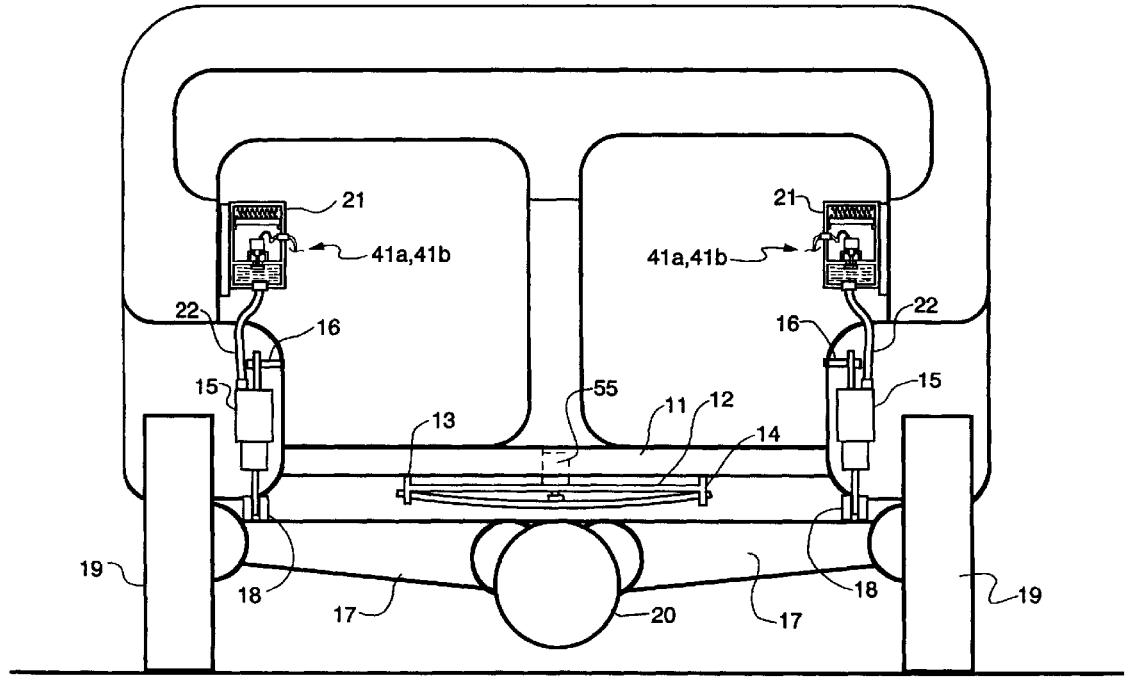

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 4 is confirmed.

Claims 2, 3 and 5-8 were not reexamined.

* * * * *